J. J. MARTIN.
Standards for Vehicles.
No. 150,695. Patented May 12, 1874.
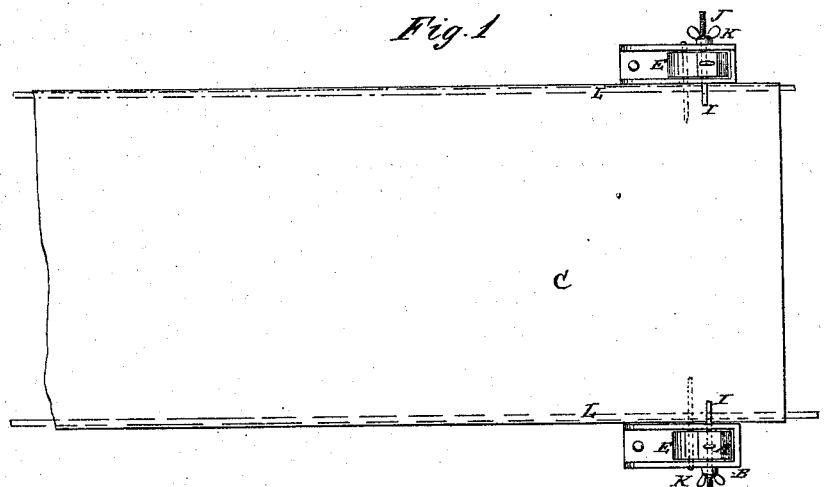
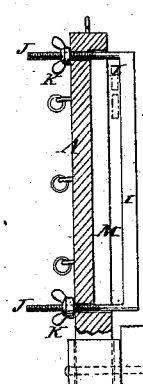
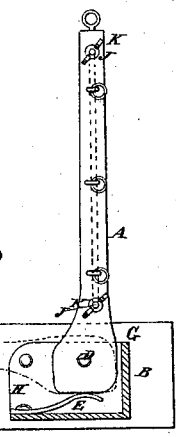
Witnesses:
Inventor:
J. J. Martin
Per
Attorneys.

UNITED STATES PATENT OFFICE.

JAMES J. MARTIN, OF HOUSTON, TEXAS.

IMPROVEMENT IN STANDARDS FOR VEHICLES.

Specification forming part of Letters Patent No. 150,695, dated May 12, 1874; application filed August 9, 1873.

*To all whom it may concern:*

Be it known that I, JAMES JOHN MARTIN, of Houston, in the county of Harris and State of Texas, have invented a new and Improved Stanchion for Flat Cars, Trucks, &c., of which the following is a specification:

My invention consists of a stanchion pivoted in a strong metal box adapted to be fastened to the side of the platform of the car or truck, the box being open at the top and at one end, so that the stanchion can be turned down on its pivot by the side of the platform, to be out of the way of loading the car or truck platform with goods which cannot be conveniently loaded when the stanchions are upright. A spring is arranged in each box, to so act on the stanchion as to hold it in the upright position; also to hold it when down. My invention also consists of a metal bar on the inside of the stanchion, extending from the platform nearly to the top, and having a screw-bolt at each end passing through the stanchion, for clamping side-boards to the stanchion when a temporary box is wanted for the platform. This bar draws back into a groove in the side of the post, flush with the surface, when it is not to be used.

Figure 1 is a plan view of a platform-car with stanchions arranged according to my invention. Fig. 2 is a side elevation of the platform and stanchion, and a sectional elevation of the box. Fig. 3 is a sectional elevation of the stanchion and end elevation of the box and a portion of the platform.

Similar letters of reference indicate corresponding parts.

A is the stanchion; B, the box in which it is pivoted, and C the car, truck, cart, or wagon bottom to which the box is attached. D is the pivot of the stanchion, and E is the spring in the box, which holds the stanchion up by pressing upward on the lower square end, and bearing it against the pivot and the end G of the box. The box is open at the top and at the end H, for the stanchion to project upward and along the platform. The full lines show the stanchion in the upright position, and the dotted lines show it as when turned down out of the way for loading and unloading. The spring holds it in the latter position by pressing the end against the pivot and the end G of the box. It also prevents it from rattling when the car or other vehicle is in motion. I is the bar on the inside of the stanchion for holding the side-boards. It extends from the platform nearly to the top of the stake, and has a screw-rod, J, at each end passing through the stanchion, and receiving a nut, K, on the outside, by which to clamp the boards L against the outside of the stanchion by screwing the rod I toward it. M is the groove in the side of the stanchion, into which the rod I is screwed when not required for use.

Having thus described my invention, I claim as new, and desire to secure by Letters Patent—

1. The stanchion A, pivoted in a metal box, B, containing the spring E, and secured to the side of a vehicle-platform, all combined substantially as specified.

2. The combination of the clamping-rod I, screw-rods J, and clamping-nuts K with stanchion A, substantially as and for the purpose specified.

3. The stanchion having a groove, M, to receive the rod I when not in use, and combined with it, substantially as specified.

JAMES JOHN MARTIN.

Witnesses:
G. KORNDORFFER,
P. L. LAMOTHE.